United States Patent
Nunoya et al.

(10) Patent No.: US 7,733,676 B2
(45) Date of Patent: Jun. 8, 2010

(54) NON-CONTACT POWER SUPPLY SYSTEM UTILIZING SYNCHRONIZED COMMAND SIGNALS TO CONTROL AND CORRECT PHASE DIFFERENCES AMONGST POWER SUPPLY UNITS

(75) Inventors: Makoto Nunoya, Komaki (JP); Kazutoshi Takeda, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 815 days.

(21) Appl. No.: 10/588,675

(22) PCT Filed: Mar. 30, 2005

(86) PCT No.: PCT/JP2005/006139

§ 371 (c)(1),
(2), (4) Date: Aug. 8, 2006

(87) PCT Pub. No.: WO2005/096485

PCT Pub. Date: Oct. 13, 2005

(65) Prior Publication Data

US 2009/0003022 A1 Jan. 1, 2009

(30) Foreign Application Priority Data

Mar. 30, 2004 (JP) ............................. 2004-097303

(51) Int. Cl.
*H02J 1/10* (2006.01)
(52) U.S. Cl. ............................. 363/72; 363/34; 363/37; 191/10
(58) Field of Classification Search .................. 363/34, 363/37, 72; 191/10
See application file for complete search history.

(56) References Cited

U.S. PATENT DOCUMENTS

| 4,886,981 | A | * | 12/1989 | Lentini et al. .................. 307/87 |
| 5,709,291 | A | * | 1/1998 | Nishino et al. ................. 191/10 |
| 5,757,634 | A | * | 5/1998 | Ferens .......................... 363/72 |
| 5,898,579 | A | * | 4/1999 | Boys et al. ..................... 363/23 |
| 5,958,060 | A | * | 9/1999 | Premerlani ................... 713/400 |
| 6,089,362 | A | * | 7/2000 | Takasan et al. ................ 191/10 |
| 6,466,469 | B1 | * | 10/2002 | Caruthers et al. ............. 363/72 |
| 6,515,878 | B1 | | 2/2003 | Meins et al. ................... 363/37 |
| 7,009,860 | B2 | * | 3/2006 | Kazutoshi .................... 363/98 |
| 7,117,383 | B2 | * | 10/2006 | Sunden ....................... 713/500 |

(Continued)

FOREIGN PATENT DOCUMENTS

JP 10-225129 8/1998

(Continued)

OTHER PUBLICATIONS

Supplementary European Search Report for European Patent Application No. 05727953.1, search completed Oct. 12, 2009.

*Primary Examiner*—Jay M Patidar
*Assistant Examiner*—Manuel Hernandez
(74) *Attorney, Agent, or Firm*—Kusner & Jaffe

(57) ABSTRACT

A non-contact power supply system is provided in which current phases of induction lines are matched. According to the output current of a power supply unit (21) and the power consumption of induction lines (19), a lead time corresponding to a phase difference between the output currents of the induction lines is determined. A signal for driving transistors (52) is advanced ahead of a drive synchronization signal (β) according to the lead time.

3 Claims, 9 Drawing Sheets

U.S. PATENT DOCUMENTS

| | | | |
|---|---|---|---|
| 2002/0024828 A1* | 2/2002 | Hayashi et al. | 363/35 |
| 2002/0048335 A1* | 4/2002 | Saeki | 375/371 |
| 2003/0198065 A1 | 10/2003 | Hayashi et al. | 363/71 |
| 2004/0208029 A1* | 10/2004 | Caruthers et al. | 363/72 |
| 2005/0068009 A1* | 3/2005 | Aoki | 323/205 |
| 2006/0167569 A1* | 7/2006 | Colombi et al. | 700/22 |

FOREIGN PATENT DOCUMENTS

| | | | |
|---|---|---|---|
| JP | 11-206043 | * | 7/1999 |
| JP | 2002-078349 | | 3/2002 |
| JP | 2003-134834 | | 5/2003 |

* cited by examiner

TRANSISTOR DRIVING
SIGNAL AT 2 kw
POWER CONSUMPTION

TRANSISTOR DRIVING
SIGNAL AT 6 kw
POWER CONSUMPTION

TRANSISTOR DRIVING
SIGNAL AT 10 kw
POWER CONSUMPTION

NON-CONTACT POWER SUPPLY SYSTEM UTILIZING SYNCHRONIZED COMMAND SIGNALS TO CONTROL AND CORRECT PHASE DIFFERENCES AMONGST POWER SUPPLY UNITS

TECHNICAL FIELD

The present invention relates to a non-contact power supply system in which induction lines fed with high-frequency current of a predetermined frequency are placed along the moving path of a moving body, a pickup coil is provided in the moving body to face the induction lines, and power is fed from electromotive force induced to the pickup coil to a load varying in power consumption in the moving body.

BACKGROUND ART

Some conventional non-contact power supply systems have long induction lines. In such a non-contact power supply system, since voltage applied to an induction line is limited, the induction line is divided and each of the divided lines is connected to a power supply unit.

In such a non-contact power supply system, even when power supply units supply high-frequency currents at the same frequency to induction lines, a phase difference occurs between the high-frequency currents. When the pickup coil of a moving body is disposed across the induction lines having such a phase difference, electromotive force induced to the pickup coil is reduced. Further, when the phase difference reaches 180°, electromotive force induced to the pickup coil is generated in opposite directions, power feeding is disabled, and the outputs of two power supply units are short-circuited through the pickup coil, resulting in overcurrent or the like.

Thus, as is disclosed in Japanese Patent Laid-Open No. 3266088, waveforms of high-frequency currents fed to two induction lines are respectively detected and measured by a current transformer (CT), the phases of the high-frequency currents of the two induction lines are compared with each other to detect a phase difference therebetween in a PLL/VCO circuit, and a high-frequency current corrected according to the phase difference is supplied as a high-frequency current to one of the induction lines.

However, such a conventional non-contact power supply system requires a current transformer (CT) for a wide frequency domain in order to actually measure the waveforms of high-frequency currents and a PLL/VCO circuit for comparing the measured waveforms of the high-frequency currents of induction lines to detect a phase difference and performing synchronization, resulting in high cost. Further, phase differences may not be matched when the waveform of the high-frequency current of one of the induction lines cannot be measured.

DISCLOSURE OF THE INVENTION

An object of the present invention is to provide a non-contact power supply system at a low cost, which can match current phases between induction lines without measuring the waveform of high-frequency current.

In order to attain the object, the present invention provides a non-contact power supply system in which a plurality of induction lines adjusted to the same impedance at a predetermined frequency are sequentially placed along a moving path of a moving body, the system comprising a power supply units each transforming direct current to alternating current of the predetermined frequency by means of a plurality of switching devices driven by a rectangular wave signal and feeding the current as output current to the induction lines, the moving body including a pickup coil facing the induction lines, the moving body having a load of varying power consumption, the load being fed with power from electromotive force induced to the pickup coil. The primary characteristic is that the power supply unit has a command signal of the predetermined frequency to drive the switching devices, the power supply unit includes a measuring unit for measuring power consumption and output current fed to the induction lines and a calculation unit for determining a phase difference between the output current fed to the induction lines and the rectangular wave signal based on the output current and power consumption measured by the measuring unit, and the power supply unit advances or delays the rectangular wave signal in response to the command signal according to the phase difference determined by the calculation unit, and drives the switching devices.

According to the configuration of the present invention, the power supply unit determines a phase difference between the output current fed to the induction lines and the rectangular wave signal based on the output current and power consumption measured by the measuring unit, and the rectangular wave signal for driving transistors is corrected according to the phase difference relative to the command signal and then outputted, so that the current phases of the induction lines can be matched. The current phases are advanced or delayed by the rectangular wave signal due to a reduction or increase in the power consumption of the induction lines. Further, the present invention does not require the current waveform of the other induction line and it is not necessary to compare waveforms to detect a phase difference, thereby reducing cost with a simple configuration.

BEST MODE FOR CARRYING OUT THE INVENTION

Embodiments of the present invention will be discussed below in accordance with the accompanying drawings.

Figure 1:
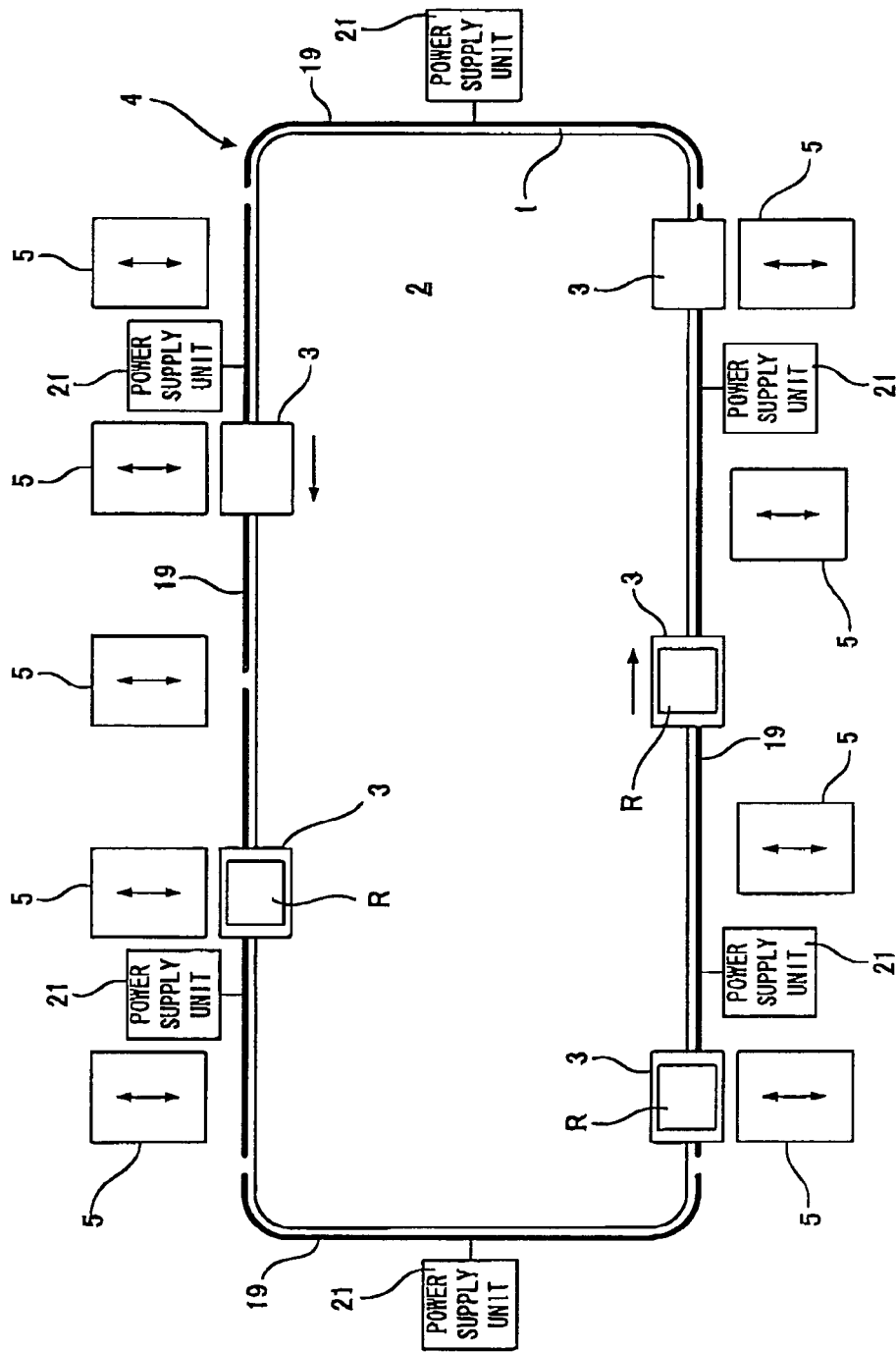
FIG. 1 is a diagram of a travel path of an article transport apparatus including a non-contact power supply system according to an embodiment of the present invention.
Figure 2:
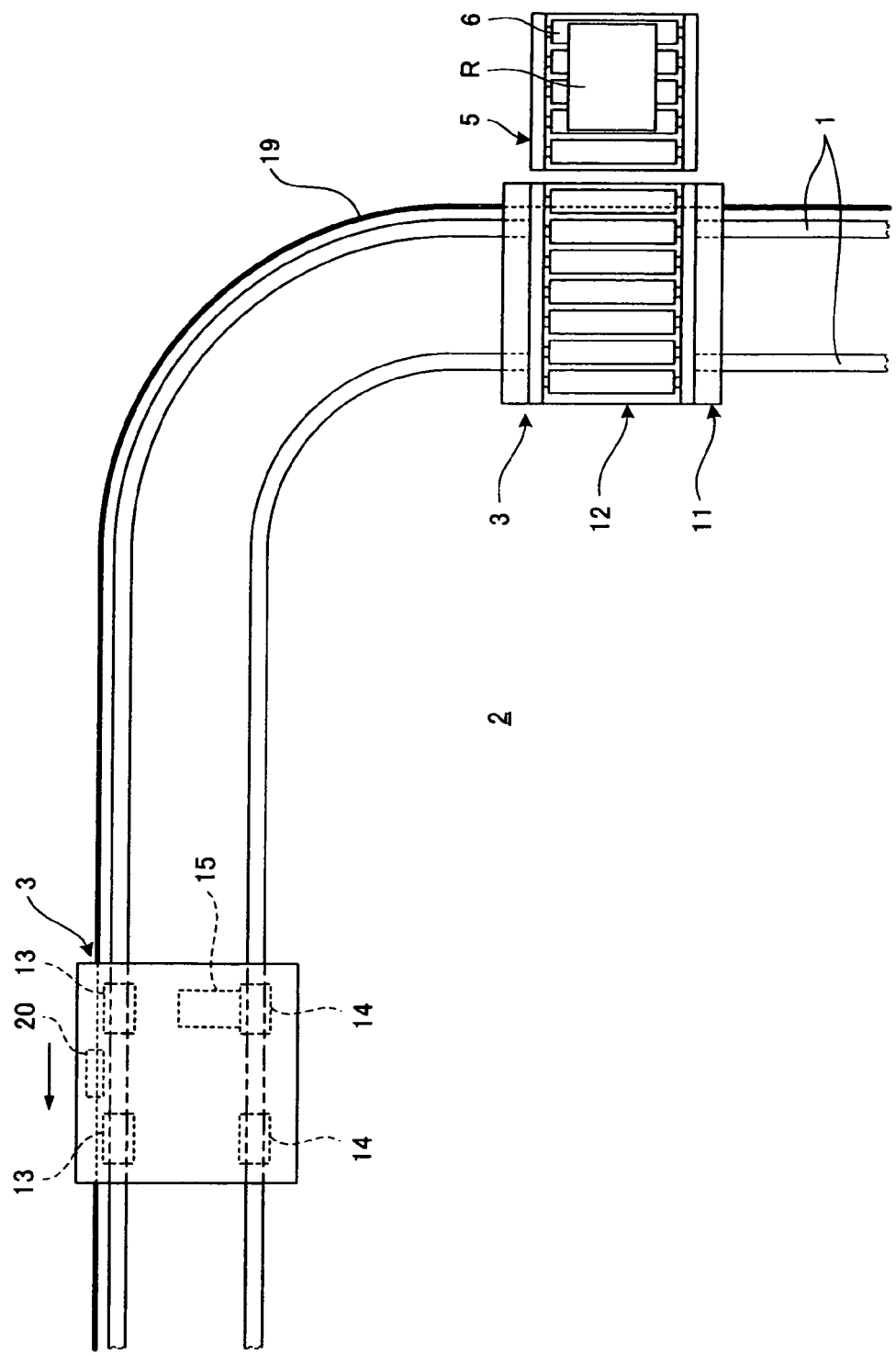
FIG. 2 is a structural diagram of a principle part of the article transport apparatus.

FIG. 1 is a travel path diagram showing an article transport apparatus including a non-contact power supply system according to an embodiment of the present invention. FIG. 2 is a principle part structural diagram showing the article transport apparatus.

In FIGS. 1 and 2, reference numeral 1 denotes a pair of transport rails arranged on a floor 2 and reference numeral 3 denotes a four-wheel article transport vehicle (an example of a moving body) which travels by itself and transports an article R while being guided along the transport rails 1. The total number of the article transport vehicles 3 is five.

The transport rails 1 make up a transport path (an example of a moving path) 4 shaped like a loop (ring). A plurality of (nine in FIG. 9) stations (article receiving units) 5 are placed along the transport path 4. The article transport vehicles 3 travel along the transport path and makeup a transport vehicle for transporting articles among the article receiving units placed along the transport path.

Each of the stations 5 includes, as a unit for transporting the articles R to and from the article transport vehicles 3, a transfer conveyor (for example, a roller conveyor, a chain conveyor, and so on) 6 for carrying in/out the articles R.

As shown in FIG. 2, the article transport vehicle 3 comprises a body 11, a transfer/loading conveyor 12, two rotatively suspended wheel devices 13, and two rotary/sliding driving wheel devices 14.

The transfer/loading conveyor 12 includes a roller conveyor and a chain conveyor which are placed on the body 11 to transfer and load the articles R. The two rotatively suspended wheel devices 13 are attached to the bottom of the body 11 and support the body 11 on one of the transport rails 1. The two rotary/sliding driving wheel devices 14 are attached to the bottom of the body 11 and support the body 11 on the other transport rail 1. The rotary/sliding driving wheel devices 14 can follow the curve of the transport rail 1 and freely (slidably) move far from and close to the rotatively suspended wheel devices 13. A transport motor (an example of a load of varying power consumption) 15 is connected to one of the rotary/sliding driving wheel devices 14. The article transport vehicle 3 is moved by the driving of the transport motor 15.

Figure 4:
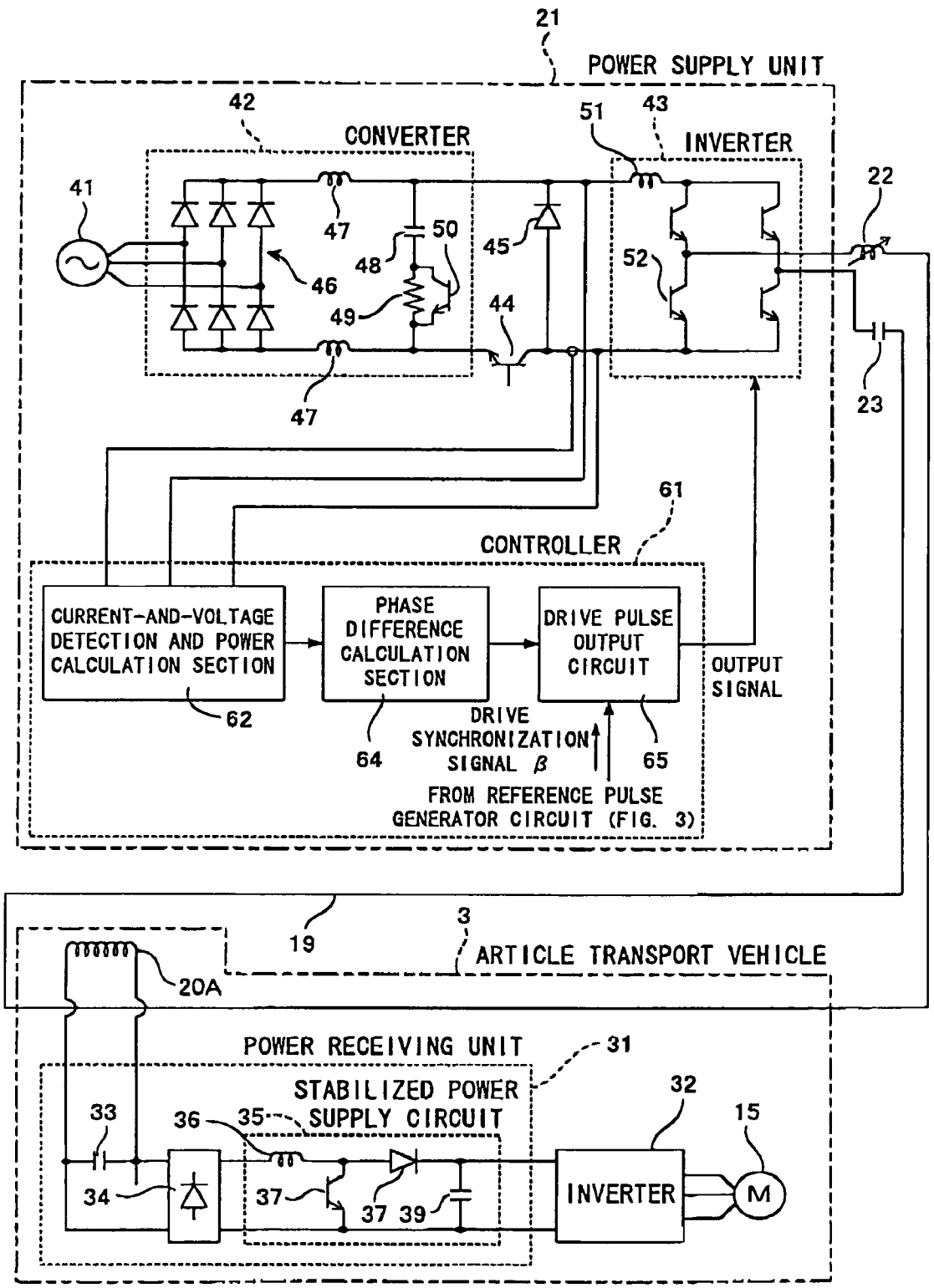
FIG. 4 is a circuit structural diagram showing the non-contact power supply system of the article transport apparatus.

Further, as shown in FIGS. 1 and 2, pairs of upper and lower induction lines 19 divided into six are sequentially laid (placed) over the outer side of one of the transport rails 1 along the traveling direction. A pickup unit 20 where electromotive force is induced by the induction lines 19 is placed outside one of the rotatively suspended wheel devices 13. In the pickup unit 20, a Litz wire is wound around a convex portion at the center of a ferrite, which is shaped like letter E in cross section, to form a pickup coil (a pickup coil facing the induction lines 19) 20A (FIG. 4). The induction lines 19 are adjusted and fixed so as to be centered on the respective concave portions of the ferrite. The electromotive force induced to the pickup coil (pickup coil) 20A feeds power to the transport motor 15. Moreover, power supply units 21 (six in total) for supplying high-frequency current of a predetermined frequency f (for example, 10 kHz) are connected to the induction lines 19, respectively.

As shown in FIG. 4, a capacitor 23 is connected in series with each of the induction lines 19 and a variable inductor 22 is connected in series with each of the induction lines 19. The variable inductor 22 makes it possible to adjust the impedance of the predetermined frequency f of the overall induction lines by adjusting an inductance value. The variable inductor 22 is connected when the length (line length) of the induction line 19 does not reach a predetermined length, in other words, when the inductance value of the induction line 19 does not reach a predetermined inductance value.

An inductance L of the variable inductor 22 and a capacitance C of the capacitor 23 are adjusted (set) such that the impedance (the impedance of the overall induction lines) of the induction lines 19, the capacitor 23, and the variable inductor 22, which are connected in series, is a capacitive reactance at the predetermined frequency f (for example, 10 kHz).

Figure 5A:
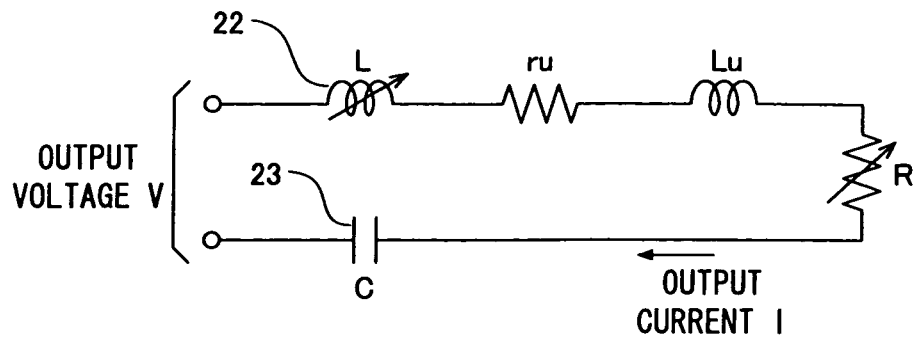
FIG. 5(a) is an equivalent circuit diagram showing an induction line of the non-contact power supply system in the article transport apparatus.

In FIG. 5(a), reference character $L_U$ denotes the inductance of the induction line 19, the inductance being determine by the length of the induction line 19, reference character $r_U$ denotes a resistance, reference character R denotes a primary equivalent resistance (hereinafter referred to as a load resistance) corresponding to the load of the five article transport vehicles 3, and reference character ω denotes an angular frequency at the predetermined frequency (for example, 10 kHz) of the induction lines 19. In order that the impedance of the capacitor 23 can be larger than the impedance of the variable inductor 22 and the induction lines 19, that is, the impedance can be a capacitive reactance, an adjustment is made as follows:

$$1/(j\omega C) > j\omega(L+L_U)$$

An absolute value is: $\{1/(j\omega C) - j\omega(L+L_U)\} < \delta$
(δ is a set value)

Figure 5B:
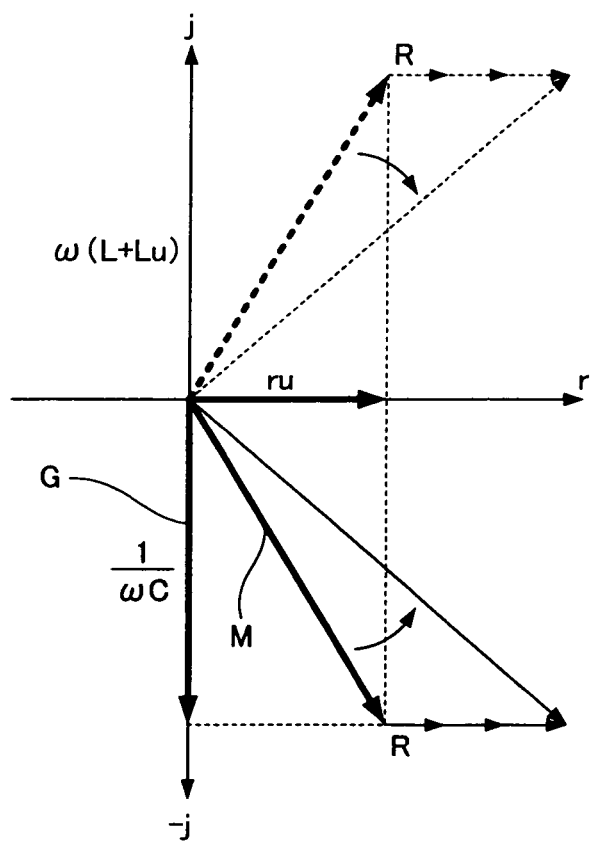
FIG. 5(b) is a diagram showing the characteristics of the induction line.

As shown in FIG. 5(b), the set value δ is set such that an impedance M is equal to a predetermined small value (for example, 1Ω) when all the article transport vehicles 3 are stopped and the load resistance R is absent (R=0). The impedance M is determined based on the resistance $r_U$ of the induction lines 19 and an impedance G determined by subtracting the impedance of the variable inductor 22 and the induction lines 19 from the impedance of the capacitor 23. The set value δ limits a difference between the impedance of the capacitor 23 and the impedance of the variable inductor 22 and the induction lines 19. In this way, the impedance of the overall induction lines is not set at zero, so that even when the load resistance R fluctuates, it is possible to reduce fluctuations in current (output power I) passing through the induction lines 19.

Since the impedance of the capacitor 23 is inversely proportional to the capacitance C of the capacitor, the capacitance C of the capacitor is reduced to increase the impedance of the capacitor 23. Thus, it is possible to achieve a simple adjustment and lower cost as compared with an adjustment for increasing the inductance L of the variable inductor 22. In this way, a beneficial effect can be obtained when the impedance of the capacitor 23 is set larger than the impedance of the variable inductor 22 and the induction lines 19, that is, when the impedance of the overall induction lines is set as a capacitive reactance.

Figure 3A:
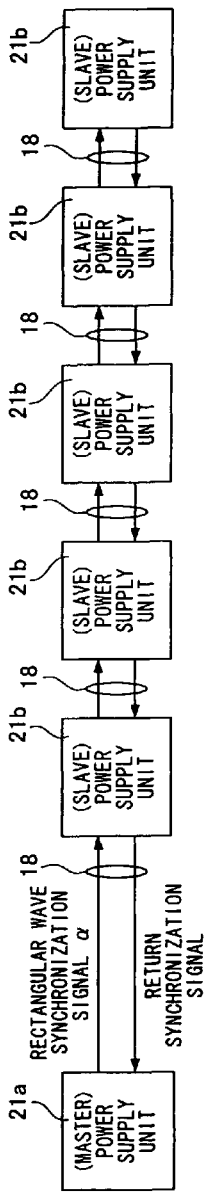
FIG. 3(a) is a diagram showing the transmission of a synchronization signal of the non-contact power supply system in the article transport apparatus.
Figure 3B:
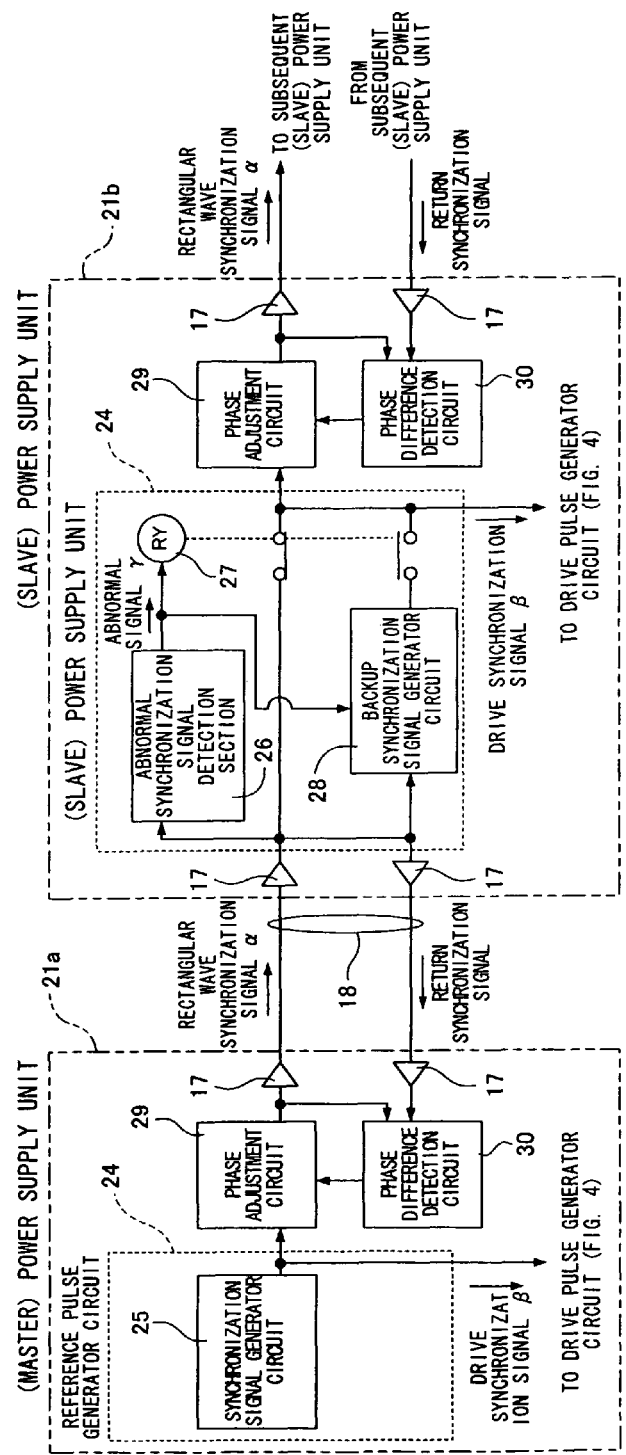
FIG. 3(b) is a block diagram showing the control of a reference pulse generator circuit of an article transport vehicle.

As shown in FIG. 3(a), the power supply units 21 are connected in series via signal transmission lines 18. A synchronization signal (an example of a command signal) α of a rectangular wave (not necessarily a rectangular wave) at the predetermined frequency (for example, 10 kHz) is transmitted from a specific power supply unit (hereinafter referred to as a master power supply unit) 21a to a power supply unit (hereinafter referred to as a slave power supply unit) 21b connected downstream. And then, the signal is sequentially transmitted (inputted/transferred) to the power supply units 21b connected in series. In each of the master power supply unit 21a and the slave power supply units 21b, as shown in FIG. 3(b), a reference pulse generator circuit 24, a phase adjustment circuit 29, and a phase difference detection circuit 30 are provided. The phase adjustment circuit 29 compensates for a delay of the synchronization signal α outputted from the reference pulse generator circuit 24 and transmits the signal to the power supply unit 21b connected downstream. The delay is caused by the line length of the signal transmission line 18 between the power supply units (21a and 21b) or 21b. The phase difference detection circuit 30 detects a phase difference between the synchronization signal α transmitted from the phase adjustment circuit 29 and a synchronization signal (return synchronization signal) fed back from the downstream power supply unit 21b to which the synchronization signal α has been transmitted. The phase adjustment circuit 29 advances (corrects) the phase of the synchronization signal α, which has been outputted from the reference pulse generator circuit 24, according to the phase difference detected by the phase difference detection circuit 30, and transmits the signal to the downstream power supply unit 21b. The phase adjustment circuit 29 and the phase difference detection circuit 30 compensate for a phase delay of the synchronization signal α, the phase delay being caused by the line length of the signal transmission line 18. And then, the synchronization signal α is transmitted to the downstream slave power supply unit 21b. Insulating amplifiers 17 are provided on the transmission end and the reception end of the signal transmission line 18.

The reference pulse generator circuit 24 of the master power supply unit 21a comprises a synchronization signal generator circuit 25 for outputting a master synchronization signal α of a rectangular wave of the predetermined frequency. The reference pulse generator circuit 24 outputs the master synchronization signal α of the synchronization signal generator circuit 25 as a synchronization signal (hereinafter referred to as a drive synchronization signal) β for driving a transistor 52 (described later).

The reference pulse generator circuit 24 of the slave power supply unit 21b comprises an abnormal synchronization signal detection section 26, a relay 27, and a backup synchronization signal generator circuit 28. The abnormal synchronization signal detection section 26 returns the received synchronization signal α as the return synchronization signal to the power supply unit 21a or 21b at the destination, and detects the abnormality of the received synchronization signal α. The relay 27 is operated (excited) by an abnormality signal γ outputted when the abnormality of the synchronization signal α is detected by the abnormal synchronization signal detection section 26. The backup synchronization signal generator circuit 28 forms a synchronization signal of the same phase with reference to the received synchronization signal α. When the backup synchronization signal generator circuit 28 receives the abnormality signal γ of the abnormal synchronization signal detection section 26, the backup synchronization signal generator circuit 28 outputs the formed synchronization signal. When the abnormality signal γ is off and the relay 27 does not operate (when a contact b of the relay 27 is off), the reference pulse generator circuit 24 allows the passage of the received synchronization signal α, transmits the signal to the slave power supply unit 21b connected downstream, and outputs the synchronization signal α as the drive synchronization signal β. When the abnormality signal γ is on and the relay 27 operates (when a contact a of the relay 27 is on), the reference pulse generator circuit 24 transmits, instead of the received synchronization signal α, the backup synchronization signal as the synchronization signal α through the phase adjustment circuit 29 to the slave power supply unit 21b connected downstream, the backup synchronization signal having been outputted from the backup synchronization signal generator circuit 28. Further, the reference pulse generator circuit 24 outputs, as the drive synchronization signal β, the backup synchronization signal having been outputted from the backup synchronization signal generator circuit 28.

In this way, the power supply units 21a and 21b each have the synchronization signal (drive synchronization signal β) for driving the transistor 52.

FIG. 4 shows the circuit configuration of the power supply unit 21 and the article transport vehicle 3.

In the article transport vehicle 3, a power receiving unit 31 is connected to the pickup coil 20A of the pickup unit 20, and the transport motor 15 is connected to the power receiving unit 31 through an inverter 32.

The power receiving unit 31 is configured as follows: a capacitor 33 forming, with the pickup coil 20A, a resonance circuit resonating at the frequency of the induction line 19 is provided in parallel with the pickup coil 20A, a rectifying diode 34 is connected in parallel with the capacitor 33 of the resonance circuit, a stabilized power supply circuit 35 for controlling output to a predetermined voltage is connected to the diode 34, and the load is connected to the stabilized power supply circuit 35. The stabilized power supply circuit 35 comprises a coil 36 for limiting current, a transistor 37 for adjusting output, and a diode 38 and a capacitor 39 which make up a filter. A transistor control unit is omitted.

The power supply unit 21 comprises an AC power supply 41 of AC200 V3 phase, a converter 42, an inverter 43, and a transistor 44 and a diode 45 for overcurrent protection. The converter 42 comprises a full-wave rectifier 46, a coil 47 making up a filter, a capacitor 48, a resistor 49, and a transistor 50 for short-circuiting the resistor 49. The inverter 43 comprises a coil 51 for limiting current and the transistors (an example of a switching device) 52 which are driven by a rectangular wave signal and configured in full bridge.

The power supply unit 21 further comprises a controller 61 for driving the transistors 52 of the inverter 43. The reference pulse generator circuit 24 is provided in the controller 61.

The controller 61 comprises a current/voltage detection power calculation section (an example of measuring unit) 62, a phase difference calculation section (an example of calculating unit) 64, and a drive pulse output circuit 65 in addition to the reference pulse generator circuit 24.

The current/voltage detection power calculation section 62 detects the output voltage and output current of the converter 42 and calculates an output power fed from the converter 42 to the inverter 43, in other words, the current/voltage detection power calculation section 62 measures the power consumption of the induction lines 19 which are fed with power, and outputs an output current fed to the induction lines 19 and the power consumption of the induction lines 19.

Figure 6A:
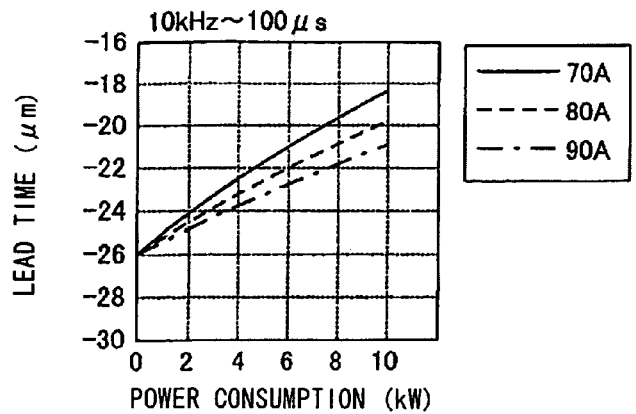
FIGS. 6(a) and 6(b) each is a characteristic diagram showing power consumption and lead time in the non-contact power supply system of the article transport apparatus.
Figure 6B:
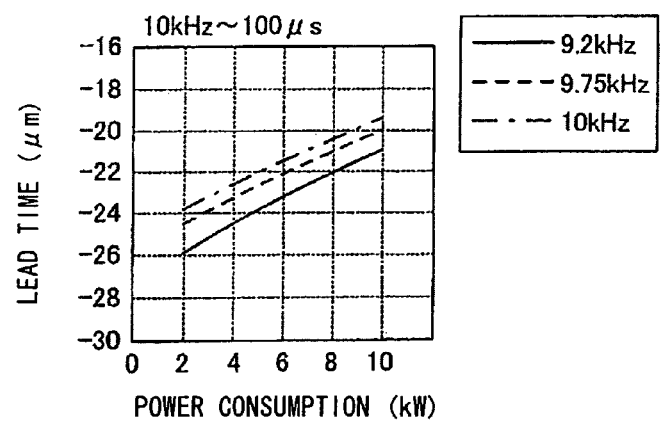
Figure 6C:
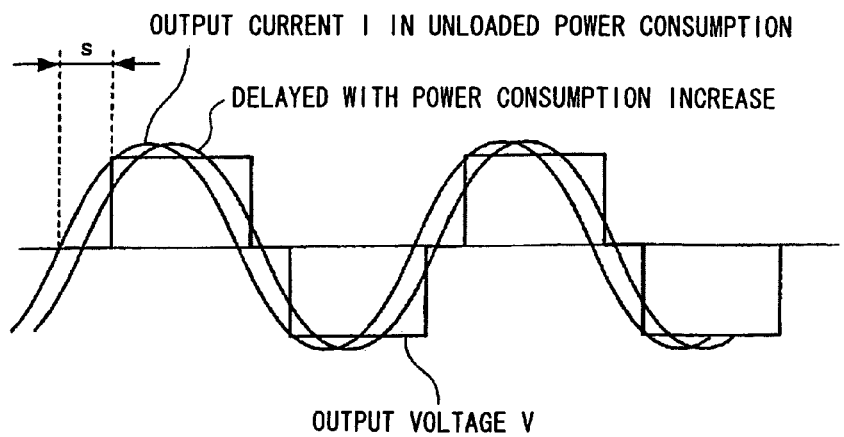
FIG. 6(c) is a waveform chart showing output current and a rectangular wave signal (output voltage)

As described above, the impedance of the induction lines 19, the capacitor 23, and the variable inductor 22 (the impedance of the overall induction lines) which are connected in series is adjusted as a capacitive reactance at the predetermined frequency. Thus, in an unloaded state where all the article transport vehicles 3 are stopped and the load resistance R is absent (power is consumed with the resistance $r_U$ of the induction lines 19, hereinafter referred to as unloaded power consumption), the output current I advances ahead of the output voltage (in phase with the rectangular wave signal for driving the transistors 52) V of the induction lines 19 as shown in FIG. 6(c). Since the induction line 19 has a different length in each of the power supply units 21, power consumption is not strictly constant among the power supply units 21 in a state in which all the article transport vehicles 3 are stopped. However, in order to match current phases among the power supply units 21, an assumed common value of power consumption at no load, for example, 2 kW is shared by the power supply units 21 as an unloaded power consumption. In this case, as shown in FIGS. 5(b) and 6(c), as the power consumption (load) increases, the output current I is delayed (lead time decreases). Under conditions that the impedance is adjusted to the predetermined impedance, as shown in FIG. 6(a), when the output current I is constant, the lead time of the output current I (corresponding to a phase difference between the output current I and the rectangular wave signal (corresponding to an output voltage signal) synchronized with the drive synchronization signal β (synchronization signal α)) is always constant at each power consumption. The lead time can be substantially expressed by a linear formula as follows:

$$s = aP + b \quad (1)$$

a=f(I)(a varies with output current)
In the example of FIG. 6(a), the following is established:

$$a = \{8 \div 10 - (I - 70) \div 10 \times 0.2\} (\mu s/kW)$$

(based on I=70A)

$$b = -26 (\mu s)$$

wherein s(μs) represents a lead time, P(kW) represents a power consumption, a(μs/kW) represents a primary coefficient, and b(μs) represents an initial value.

Formula (1) is stored beforehand in the phase difference calculation section 64, a phase difference s is calculated based on the output current I and the power consumption P which are measured by the current/voltage detection power calculation section 62, and a calculated lead time s is outputted to the drive pulse output circuit 65. As the frequency of the induction lines 19 decreases, as shown in FIG. 6(b), the lead time s advances (increases). Therefore, when the assigned frequency of the induction lines 19 is changed, the frequency may be measured to correct the lead time s according to Formula (2) below.

$$s = aP + b + c \quad (2)$$

c=f(q)=d(q-10){d is a factor of proportionality (μs/kHz)}
(c varies with the frequency q)
In the example of FIG. 6(b), the following is established:

$$d = 2 (\mu s/kHz)$$

wherein q(khz) represents a frequency.

As a matter of course, the formulas may have higher-order terms because of the characteristics (for example, the magnetic property or the like of the core of the pickup coil 20A) of the circuit on the power receiving side of the article transport vehicle 3. Arithmetic expressions can be obtained according to the higher-order terms.

When receiving the lead time s determined by the phase difference calculation section 64, the drive pulse output circuit 65 advances (corrects) the rectangular wave signal, which drives the transistors 52 of the inverter 43, ahead of the rectangular wave signal (corresponding to the drive synchronization signal β inputted from the reference pulse generator circuit 24) of unloaded power consumption according to the lead time s in order to compensate for a delay caused by increased power consumption, and then the drive pulse output circuit 65 outputs the signal to the transistors 52.

The following will discuss the operation of the circuit configuration of the power supply unit 21, the induction lines 19, and the article transport vehicle 3.

First, the alternating current of AC200 V3 phase from the AC power supply 41 is transformed into direct current by the converter 42, transformed into a high frequency, for example, an alternating current of 10 kHz by the inverter 43, and fed to the induction lines 19. Magnetic fluxes generated on the two upper and lower induction lines 19 cause large electromotive force on the pickup coil 20A of the article transport vehicle 3 disposed on the transport rails 1 which resonate at the frequency of the induction lines 19. Alternating current generated by the electromotive force is rectified by the diode 34, rectified to a predetermined voltage by the stabilized power supply circuit 35, and fed to the motor 15 through the inverter 32. The wheel devices 14 are driven by the motor 15 which has been fed with power, and the article transport vehicle 3 of the moving body is moved while being guided along the transport rails 1.

In the controller 61, the current/voltage detection power calculation section 62 measures the output current I and power consumed by the inverter 43, that is, power consumption P consumed by the connected induction lines 19, the phase difference calculation section 64 determines a lead time s corresponding to a phase difference based on the output current I and the power consumption P which have been measured in the current/voltage detection power calculation section 62, and the drive pulse output circuit 65 advances (corrects) the rectangular wave signal, which drives the transistors 52, ahead of the drive synchronization signal β according to the lead time s having been determined by the phase difference calculation section 64 and outputs the signal to the transistors 52. When power consumption gradually increases and the lead time s delays (decreases), the rectangular wave signal is advanced. When power consumption gradually decreases and the lead time s advances (increases), the rectangular waves signal is gradually delayed (FIG. 7).

Thus, the phase of current fed to the induction lines 19 is matched with the phase of output current of unloaded power consumption. The phase of current fed to the induction lines 19 advances when the power consumption of the induction lines 19 decreases, and the phase delays when the power consumption increases. Therefore, the phases of current fed to the induction lines 19 are adjusted according to the synchronization signal α having been transmitted from the master power supply unit 21a, and the current phases of all the induction lines 19 are matched.

In the reference pulse generator circuit 24, it is monitored whether the master rectangular wave synchronization signal α is abnormal. When the signal is not abnormal, the phase adjustment circuit 29 compensates for a phase delay of the master rectangular wave synchronization signal α. The phase delay is caused by the line length of the signal transmission line 18. Then, the signal is transmitted to the subsequent (downstream) slave power supply unit 21b and supplied as the drive synchronization signal β to the drive pulse output circuit 65.

Figure 7:
FIG. 7 is a signal waveform chart of the non-contact power supply system in the article transport apparatus.
Figure 7:
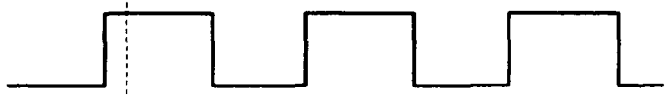
Figure 7:

Hence, as shown in FIG. 7, the rectangular wave signal for driving the transistors 52 is advanced relative to the master rectangular wave synchronization signal α according to power consumption in the power supply unit 21 and thus the output currents of the induction lines 19 are matched in phase.

As a result, the output currents of the induction lines 19 are matched in phase without measuring the waveform of high-frequency current.

In the reference pulse generator circuit 24 of the slave power supply unit 21b, when the received master rectangular wave synchronization signal α is found to be abnormal, the backup synchronization signal generator circuit 28 having referred to the synchronization signal α outputs the backup synchronization signal. The backup synchronization signal is transmitted as the master rectangular wave synchronization signal α to the subsequent downstream slave power supply unit 21b through the phase adjustment circuit 29, and is supplied as the drive synchronization signal β to the drive pulse output circuit 65. Thus, the signal can be synchronized with the output current of the slave power supply unit 21b connected to the output side (downstream side) and the output currents of the induction lines 19 are matched in phase.

As described above, according to the present embodiment, in each of the power supply units 21, a lead time corresponding to a phase difference is determined by the phase difference calculation section 64 based on output current and power consumption which have been measured by the current/voltage detection power calculation section 62, the rectangular wave signal for driving the transistors 52 is advanced (corrected and advanced) according to the lead time which decreases with power consumption, and then the signal is outputted, so that the phase of current fed to the induction lines 19 can be matched with the phase of output current of unloaded power consumption. The phase of current fed to the induction lines 19 is delayed by increased power consumption of the induction lines 19. As a result of the matching, the phase can be adjusted according to the synchronization signal α transmitted from the master power supply unit 21a and the current phases of all the induction lines 19 can be matched. It is thus possible to prevent power consumption from being excessively consumed due to the current phases of the adjacent induction lines 19 when the article transport vehicle 3 moves across the induction lines 19, prevent the outputs of the two power supply units 21 from being short-circuited through the pickup coil 20a, eliminate the need for the waveform of current of another induction line 19, and eliminate the need for comparing waveforms to detect a phase difference. As a result, current phases can be matched between the induction lines with an inexpensive and simple configuration without the need for a conventional CT or PLL/VCO circuit having a wide frequency domain and thus the cost is reduced.

According to the present embodiment, the synchronization signal α is transmitted from the master power supply unit 21a to the downstream slave power supply unit 21b after being compensated for a phase delay caused by the line length of the signal transmission line 18 between the master power supply unit 21a and the slave power supply unit 21b connected downstream. Then, the synchronization signal α is transmitted from the slave power supply unit 21b to the downstream slave power supply unit 21b after being compensated for a phase delay caused by the line length of the signal transmission line 18 between the slave power supply unit 21b and the downstream slave power supply unit 21b. Therefore, the synchronization signal α having been compensated for a phase delay caused by the line length of the signal transmission line 18 is transmitted to each of the slave power supply units 21b, so that the synchronization signals α of the slave power supply units 21b can be matched with the synchronization signal α having been transmitted from the master power supply unit 21a. Further, each of the slave power supply units 21b outputs a rectangular wave signal based on the synchronization signal α having been received from the power supply unit 21a or 21b connected upstream, so that the phase of current fed to the induction lines 19 can be matched with the synchronization signal α having been transmitted from the master power supply unit 21a. The phase of current fed to the induction lines 19 has been delayed from the rectangular wave signal due to power consumption of the induction lines 19. With this matching, the current phases of all the induction lines 19 can be matched.

Moreover, according to the present embodiment, when the synchronization signal α is not received by the master power supply unit 21a, a rectangular wave signal is outputted based on the backup synchronization signal of the backup synchronization signal generator circuit 28, so that the feeding of current to the induction lines 19 is not stopped and a displacement of a current phase is minimized between the adjacent induction lines 19. Hence, it is possible to prevent the occurrence of problems in the traveling of the article transport vehicle 3.

The present embodiment does not describe the control of the pulse width of the rectangular wave signal for driving the transistors 52. The pulse width may be controlled according to necessary power.

In the present embodiment, the phases of output current of the induction lines 19 are matched with the phase of output current of unloaded power consumption. The phases of output current of the induction lines 19 may be matched by advancing (correcting and advancing) or delaying (correcting and delaying) the rectangular wave signal relative to the phase of predetermined power consumption and outputting the signal.

In the present embodiment, the transistor 52 is used as the switching device of the power supply unit 21. The switching device is not limited to a transistor and a semiconductor device such as a thyristor may be used.

In the present embodiment, the article transport vehicle 3 guided along the transport rails 1 is a moving body. The moving body is not limited to the article transport vehicle 3 and any unit may be used as long as the unit moves along a fixed moving path. In this case, induction lines adjusted to an equal inductance value are laid along the moving path.

Figure 8:
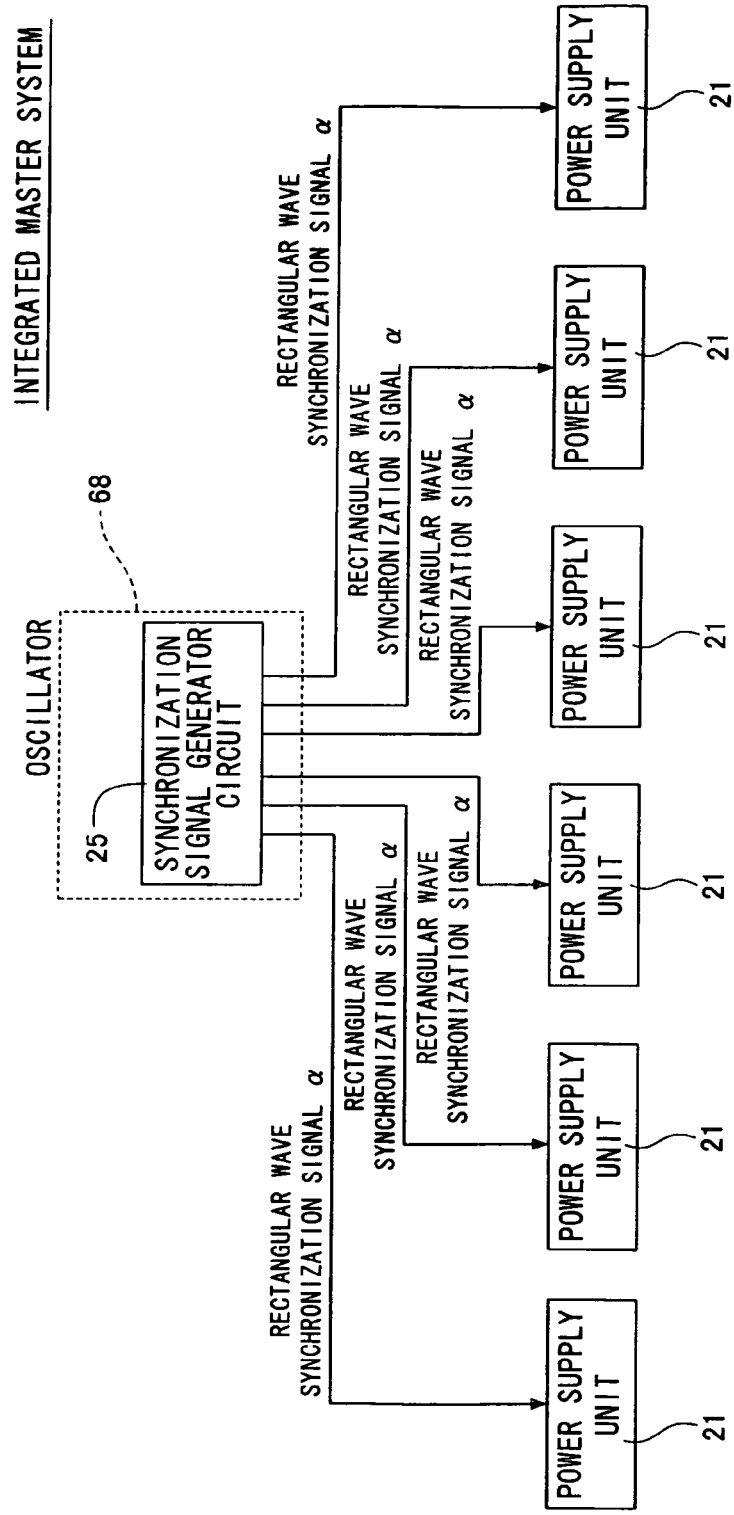
FIG. 8 is a diagram showing the transmission of a synchronization signal of an article transport apparatus including a non-contact power supply system according to another embodiment of the present invention.

In the present embodiment, the power supply units 21 are connected in series and the synchronization signal α is transmitted from the specific master power supply unit 21a sequentially to the slave power supply units 21b. The synchronization signal α may be directly outputted from the specific master power supply unit 21a to the slave power supply units 21b. In this case, in the specific master power supply unit 21a, the phase adjustment circuit 29 and the phase difference detection circuit 30 are provided for each of the slave power supply units 21b to compensate for a delay of the synchronization signal α, the delay being caused by the line length of the signal transmission line 18 between the master power supply unit 21a and the slave power supply unit 21b. Further, the system of FIG. 8 may be used which comprises, instead of the specific master power supply unit 21a, an oscillator (an example of a command device) 68 including the synchronization signal generator circuit 25 for generating the rectangular wave synchronization signal α. The rectangular wave synchronization signal α is directly outputted from the oscillator 68 to the power supply units 21 on the induction lines 19 (integrated master system).

Figure 9:
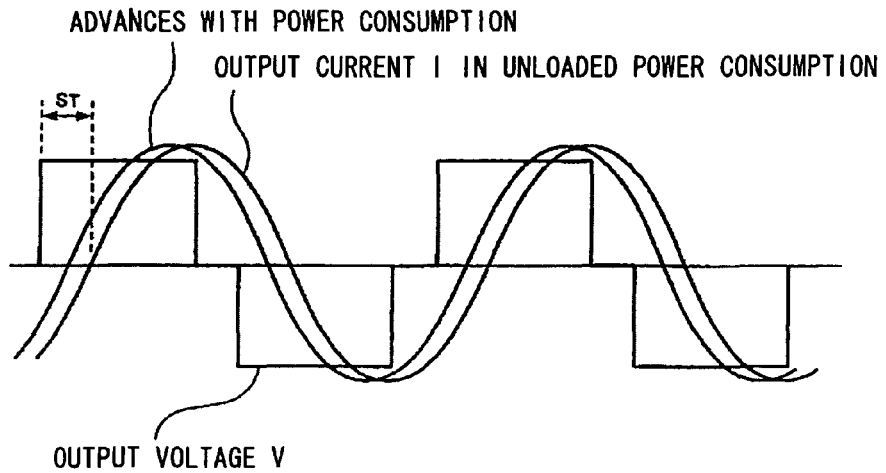
FIG. 9 is a waveform chart showing output current and a rectangular wave signal (output voltage) of the non-contact power supply system according to another embodiment of the present invention.

In the present embodiment, the impedance of the induction lines 19, the capacitor 23, and the variable inductor 22 connected in series is adjusted as the capacitive reactance at the predetermined frequency f. The impedance may be adjusted so as to form a resonance circuit or an inductive reactance. During unloaded power consumption, as indicated by a broken line of FIG. 5(b), the output current is delayed from the output voltage (in phase with the rectangular wave for driving the transistors 52) V of the induction lines 19. As shown in FIGS. 5(b) and 9, the output current advances (phase difference decreases) with power consumption (load). Also in this state, under conditions that the inductance of the induction line 19 is adjusted by the variable inductor 22 and forms, with the resonant capacitor 23, a resonance circuit resonating at the predetermined frequency, based on a fact that a phase difference is always constant at each power consumption when output voltage is constant, a delay time (decreases with power consumption) relative to power consumption is measured beforehand as in FIG. 6(a) and the delay time can be calculated based on Formula (1).

Figure 10:
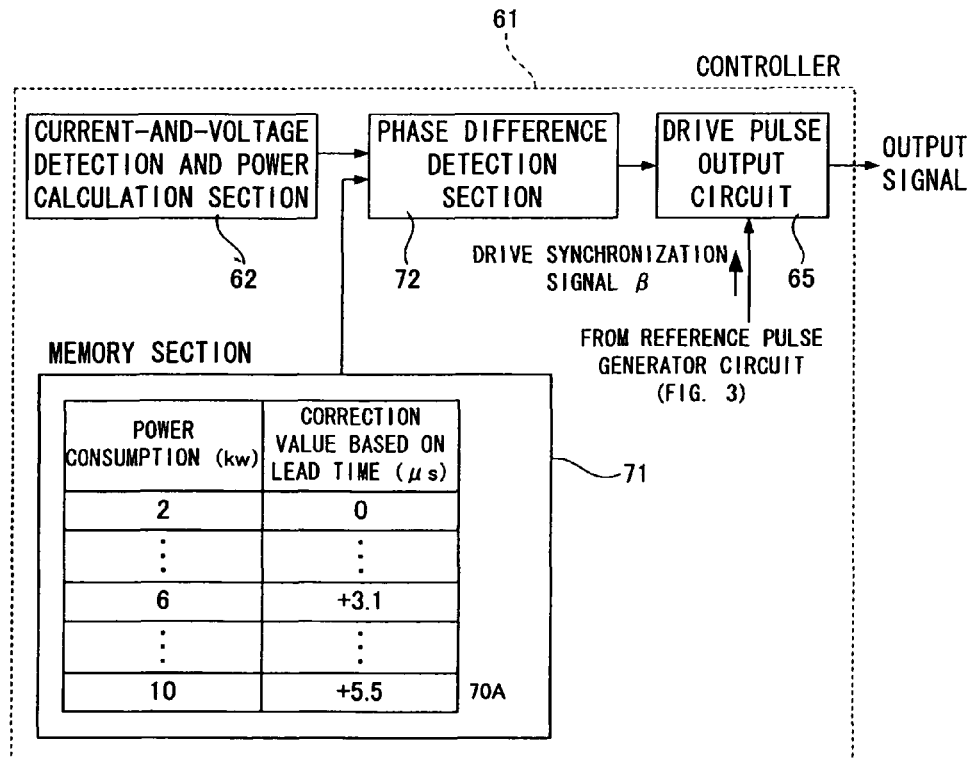
FIG. 10 is a structural diagram showing a controller of the non-contact power supply system of the article transport apparatus according to another embodiment of the present invention.

In the present embodiment, the controller 61 comprises the phase difference calculation section 64 for determining a phase difference (lead time). As shown in FIG. 10, a memory section (an example of storage means) 71 and a phase difference detection section 72 may be provided instead of the phase difference calculation section 64. As shown in FIG. 6(a), regarding a predetermined output current (for example, 80 A), the impedance (the impedance of the overall induction lines) of the induction lines 19, the capacitor 23, and the variable inductor 22 connected in series at the predetermined frequency is set as the capacitive reactance as described above, so that the output current advances ahead of the output voltage (in phase with the rectangular wave signal for driving the transistors 52) V. Although the output current I delays with power consumption, under conditions that the impedance is adjusted to a predetermined impedance, a phase difference is always constant at each power consumption. The memory section 71 stores, at each predetermined output current (for example, 70A), correction values based on a lead time measured beforehand at each power consumption while a lead time is set at "0" for the output current of unloaded power consumption (for example, 2 kW) and the rectangular wave signal (corresponding to an output voltage signal) synchronized with the drive synchronization signal β (synchronization signal α). For example, the memory section 71 stores a phase difference (e.g., +3.1 μs) for compensating for a delay of the power consumption of 6 kW from 2 kW and a phase difference (e.g., 5.5 μs) for compensating for a further delay of the power consumption of 10 kW. Moreover, the phase difference detection section 72 searches the memory section 71 based on power consumption measured by the current/voltage detection power calculation section 62 and determines a corrected lead time. At this point, the drive pulse output circuit 65 advances (corrects) the rectangular wave signal, which drives the transistors 52, ahead of the drive synchronization signal β (synchronization signal α) according to the corrected lead time, and outputs the signal. The phases of the output current of the induction lines 19 are matched with the phase of output current in unloaded power consumption. A correction value based on a lead time measured at each power consumption may be stored relative to the phase of the predetermined power consumption (for example, 6 kW). For example, the memory section 71 stores a phase difference (for example, −3.1 μs) for compensating for an advance of the power consumption of 2 kW from 6 kW and a phase difference (for example, +2.4 μs) for compensating for a delay of the power consumption of 10 kW. In this case, the rectangular wave signal for driving the transistors 52 is delayed from or advanced ahead of (corrected) the drive synchronization signal β (synchronization signal α), and then the signal is outputted.

INDUSTRIAL APPLICATION

The non-contact power supply system of the present invention is applicable to a load transport system or the like where induction lines fed with high-frequency current of a predetermined frequency are placed along the moving path of a moving body, and the moving body is fed from the induction lines to transport an article while traveling along the moving path.

The invention claimed is:
1. A non-contact power supply system comprising:
a moving body:
a plurality of induction lines arranged sequentially along a moving path of the moving body and adjusted to an equal impedance at a predetermined frequency; and
a plurality of power supply units respectively transforming direct current to alternating current of the predetermined frequency by means of a plurality of switching devices each driven by a rectangular wave signal, and feeding the transformed current as output current to the induction lines,
the moving body including a pickup coil facing the induction lines, the moving body having a load varying in power consumption, the load being fed with power from electromotive force induced to the pickup coil, wherein
the power supply units each includes a measuring unit for measuring power consumption and output current fed to the induction lines and a calculation unit for determining a phase difference between the output current fed to the induction lines and the rectangular wave signal based on the output current and power consumption measured by the measuring unit,
a specific one of the power supply units and the other power supply units are connected in series via signal transmission lines,
the specific power supply unit includes
a reference pulse generator circuit for outputting a synchronization signal as command signal of the predetermined frequency to drive the switching devices;
a phase adjustment circuit for compensating for a delay of the synchronization signal outputted from the reference pulse generator circuit and transmitting the signal to the power supply unit connected downstream, the delay being caused by a line length of the signal transmission line between the specific power supply and the power supply unit connected downstream; and
a phase difference detection circuit for detecting a phase difference between the synchronization signal transmitted from the phase adjustment circuit and a return synchronization signal fed back from the downstream power supply unit to which the synchronization signal has been transmitted,
the specific power supply unit advances or delays the rectangular wave signal in response to the synchronization signal outputted from the reference pulse generator circuit according to the phase difference determined by the calculation unit, thereby to drive the switching devices,
the phase adjustment circuit corrects a phase of the synchronization signal, which has been outputted from the reference pulse generator circuit, according to the phase difference detected by the phase difference detection circuit, and transmits the signal to the downstream power supply unit, each of the other power supply units includes
- a phase adjustment circuit for compensating for a delay of the synchronization signal having been received from the upstream power supply unit and transmitting the signal to the power supply unit connected downstream, if applicable, the delay being caused by a line length of the signal transmission line between the power supply unit and the power supply unit connected downstream; and
- a phase difference detection circuit for detecting a phase difference between the synchronization signal transmitted from the phase adjustment circuit and a return synchronization signal fed back from the downstream power supply unit, if applicable, to which the synchronization signal has been transmitted, and each of the phase adjustment circuits of the other power supply units corrects a phase of the synchronization signal having been received from the upstream power supply unit according to the phase difference detected by the phase difference detection circuit, and transmits the signal to the downstream power supply unit, if applicable; and each of the other power supply units advances or delays the rectangular wave signal in response to the synchronization signal having been received from the power supply unit connected upstream according to the phase difference determined by the calculation unit, thereby to drive the switching devices, wherein each of the other power supply units has a downstream power supply unit except the last power supply unit in the series connection.

2. The non-contact power supply system according to claim 1, wherein each of the other power supply units includes a backup synchronization signal generator circuit for forming a backup synchronization signal of a same phase with reference to the received synchronization signal, and when the command signal is not inputted from the upstream power supply unit, advances or delays the rectangular wave signal in response to the backup synchronization signal as the command signal and drives the switching devices.

3. The non-contact power supply system according to claim 1, wherein a capacitor and a variable inductor are connected in series with the induction lines, and
the induction lines, capacitor, and variable inductor connected in series have an impedance of the predetermined frequency set as a capacitive reactance.

* * * * *